3,444,184
N,N'-DIALLYL DIIMIDE OF 1,2,3,4-CYCLO-
PENTANE-CARBOXYLIC ACID
John Christos Petropoulos, Norwalk, and Roland Ralph
Di Leone, Rowayton, Conn., assignors to American
Cyanamid Company, Stamford, Conn., a corporation
of Maine
No Drawing. Filed Apr. 30, 1965, Ser. No. 452,399
Int. Cl. C07d 27/28; C08g 20/16
U.S. Cl. 260—326.3         1 Claim

ABSTRACT OF THE DISCLOSURE

A compound of the structure:

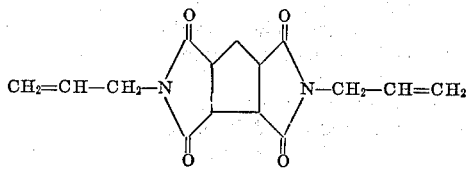

which may be employed as a polymer precursor.

---

The present invention involves the preparation of certain new and useful compounds which may be employed as monomeric building blocks in the synthesis of new polymeric materials having unusually high thermal stability.

The particular and primary object of our invention is to disclose to the plastics and resins art a new class of substituted cycloalkane imides capable of easy cure into durable thermosetting resins.

Accordingly, our invention from a product standpoint comprises the class of monomeric materials illustrated below. These monomers may be polymerized by known techniques to form the resins characterized above. The compounds have the following general structures:

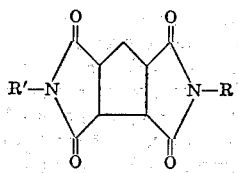

Formula I wherein the substituents represented by the symbols R and R' which may be the same or different are either hydrogen or a lower alkenyl group such as vinyl or allyl, hydroxyalkyl such as hydroxy ethyl, cyanoethyl, alkyl such as methyl or ethyl or carboxymethyl.

The polimide polymers derived from cure of the above monomers are tough hard resinous masses with outstanding thermal and oxidative stability. The polymer when formed will have up to 200 or 300 recurring units of the above monomer fusible into a hard mass. The prepolymer on the other hand where $n$ is 1 resembles physically a white solid material which is capable of being melted at about 110° C. for admixture with other ingredients and cured.

The novel monomers of our invention may be prepared by a method which may be typically illustrated by the preparation of cyclopentane diimide to wit:

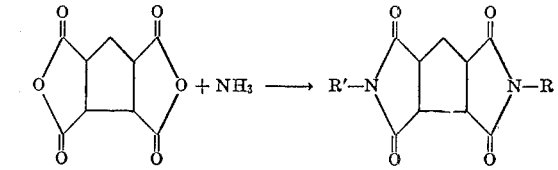

In the above reaction wherein R and R' are as identified above, about 21 parts of the reactant cyclopentane dianhydride is dissolved in an organic solvent such as acetonitrile. While stirring this mixture anhydrous ammonia is bubbled through until the salt which forms is all brought down. This usually takes about 30 minutes. This salt is heated under pressure for about 3 hours until the white solid which remains is recovered and purified by conventional techniques.

A polymer of the above monomer or of any of the novel class of monomers described in Formula I above can be formed by melting the monomer, pouring the molten monomer into a mold preheated to about 120° C. and curing at a temperature of 125° C. for about 72 hours. The cured hard product would have about 200 or 300 repeating units in the polymer. The uses of such polymeric materials are as colding compounds, plasticizers, adhesives, potting resins, encapsulating resins, laminating resins and the like.

Our inventive concept and its reduction to practice will be more concretely illustrated by the several selected examples of our novel compositions and a mode of the manufacture.

EXAMPLE 1

Preparation of cyclopentane diimide

Cyclopentane dianhydride (21 parts) was dissolved in 200 parts of acetonitrile. While this mixture was stirred, anhydrous ammonia was bubbled through until salt no longer formed. The salt was collected by vacuum filtration, and air-dried. This salt was charged to a one neck flask. The flask was heated in an oil bath at 150° C. under a vacuum of 10 mm. of mercury for 3 hours. The white solid that remained was recrystallized from glacial acetic acid M.P. 293–296° C.

Analysis.—Calc. for $C_9HO_4N_2$; C, 51.92; H, 3.85; N, 13.46. Found: C, 51.65; H, 4.11; N, 13.29.

EXAMPLE 2

Preparation of cyclopentane diallylimide

Cyclopentanedianhydride (150 parts), allyl amine (57 parts) and 800 parts of xylene were charged to a two liter 3-neck flask equipped with stirrer condenser and Dean Stark trap. The mixture was heated to reflux for 3 hours or until the theoretical water was obtained. Cyclopentane diallylimide was isolated with the xylene by cooling, M.P. 101–103° C.

EXAMPLE 3

Preparation of casting of cyclopentane diallylimide

Cyclopentanediallylimide (25 parts) was melted at 100° C. and mixed with 2% t-butyl perbenzoate. The molten monomer was then poured into a mold preheated at 120° C. and the casting was cured at 125° C. for 72 hours. The cured product was tough and hard.

We claim:
1. A compound of the structure:
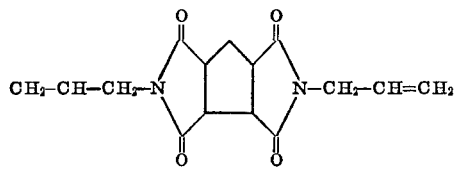
References Cited
UNITED STATES PATENTS
3,297,714   1/1967   Van Volkenburgh ___ 260—326.3
ALEX MAZEL, *Primary Examiner.*
J. A. NARCAVAGE, *Assistant Examiner.*
U.S. Cl. X.R.
260—78.4, 88.3

UNITED STATES PATENT OFFICE
CERTIFICATE OF CORRECTION

Patent No. 3,444,184                                                                May 13, 1969

John Christos Petropoulos et al.

It is certified that error appears in the above identified patent and that said Letters Patent are hereby corrected as shown below:

Column 1, line 56, "polimide" should read -- polyimide --. Column 2, line 26, "colding" should read -- molding --; line 45, "$C_9HO_4N_2$" should read -- $C_9H_8O_4N_2$ --; line 62, "100° C." should read -- 110° C. --; line 64, "at", second occurrence, should read -- to --. Column 3, line 5, "$CH_2-CH-CH_2-N$" should read -- $CH_2=CH-CH_2-N$ --.

Signed and sealed this 14th day of April 1970.

(SEAL)
Attest:

Edward M. Fletcher, Jr.                                    WILLIAM E. SCHUYLER, JR.
Attesting Officer                                                       Commissioner of Patents